Patented May 9, 1950

2,506,635

UNITED STATES PATENT OFFICE 2,506,635

DDT INSECTICIDE DUST AND PROCESS FOR MAKING SAME

Albert L. Flenner, Wilmington, Del., assignor to E. I. du Pont de Nemours & Company, Wilmington, Del., a corporation of Delaware No Drawing. Application July 8, 1946, Serial No. 682,151

9 Claims. (Cl. 167—30)

1

This invention relates to insecticides containing 2,2 - bis-(4-chlorophenyl) - 1,1,1 - trichloroethane, which is more commonly known and will be referred to hereinafter as DDT. It is directed more particularly to dusts and water-dispersible powders comprising a dispersed system consisting essentially of technical DDT and an adsorbent powder, the particles of the dispersed system having an average size less than about 5 microns. The invention also relates to processes for the manufacture of these compositions and to methods for employing the compositions in insect control.

DDT has recently received much publicity as an outstanding insecticide. The acclaim appears justified inasmuch as insecticidal compositions containing even extremely small amounts of DDT in solution or in emulsion have proven highly effective in the control of a variety of insects. In uses where it is preferred to employ DDT in the form of a dust or a water suspension of a dipersible powder, as in the case of application to agricultural crops, the results in general have, however, been surprisingly less favorable.

Notwithstanding the outstanding utility in insect control of solutions and emulsions containing DDT, there has existed a need for satisfactory dusts and water-dispersible powders containing DDT since it is not desirable or practical to employ solutions or emulsions containing DDT on food crops because the solvents in such liquid compositions kill or damage the plants.

In the application of the dusts and water-dispersible powders heretofore available, it has been necessary generally to employ larger amounts of DDT than would be required to effect a similar insect control using solutions or emulsions of the material. Moreover, the dusts and water-dispersible powders containing technical DDT which have been available heretofore have shown a tendency to cake on standing prior to use, this tendency being especially noted in compositions containing more than about 25 per cent technical DDT. In addition, the water-dispersible powders generally have not remained in a satisfactory suspension in water in the spray equipment normally used.

In addition to the need for more effective free-flowing DDT dusts and powders more readily dispersible in water, there has existed a need for compositions containing a higher concentration of DDT. The latter need is dictated in part by the interest in keeping shipping and packaging costs at a minimum and conserving shipping and storage space. A further interest served

2 thru the provision of insecticidal compositions containing high concentration of DDT is that such compositions permit the use of lesser amounts of residue on treated vegetation. The smaller the amount of residue on vegetation, the less interference there is with the plant photosynthesis and thus the advantage of using compositions containing large amounts of DDT is apparent since such use requires a smaller weight of insecticidal composition per unit area than would be required otherwise to provide the necessary protection. So far, the art has failed to provide compositions having these advantages and containing technical DDT substantially in excess of 50 per cent by weight.

It is an object of this invention to provide more effective insecticidal dusts and water-dispersible powders containing technical DDT. It is a further object to provide dusts and water-dispersible powders containing technical DDT and an adsorbent powder in a dispersed system wherein the particles of the DDT-adsorbent powder system have an average size less than about 5 microns. It is a still further object to provide free-flowing insecticidal dusts and water-dispersible powders containing up to about 80 per cent by weight of technical DDT. Further objects will become apparent hereinafter.

The foregoing and other objects of the invention are attained by means of compositions comprising a dispersed system consisting essentially of technical DDT and an adsorbent powder in which the particles of the dispersed system have an average size less than about 5 microns.

The dispersed system having an average particle size less than about 5 microns, which is an essential feature of the compositions of this invention, may be prepared by suspending a mixture of technical DDT and an adsorbent powder in a high velocity gas stream and pulverizing the technical DDT-adsorbent powder mixture to an average particle size less than about 5 microns by impact and attrition of the suspended particles against one another and against the walls of the pulverizing chamber employed.

The essential components of the dispersed system are technical DDT and an adsorbent powder. While the compositions of the invention may be prepared by using highly refined DDT as well as by the use of technical DDT, the advantages of the invention are more fully realized with the technical grade material.

The term "technical DDT" used herein refers to the product prepared commercially generally by the condensation of two moles of chlorobenzene with one mole of chloral. This product unless subjected to refinement by recrystallization processes has a melting point below 102° C. This commercial product, the so-called "technical DDT," is usually characterized by its set point since melting points cannot be determined accurately with the unrefined commercial product. The set point of commercial DDT is the criterion employed generally by the art to measure the purity of the product. As stated above, the advantages of this invention are more fully realized as the purity of the DDT employed decreases, the process for preparing dispersed systems of the invention having its optimum value when the set point of the DDT used varies from about 87° to about 90° C. Thus while compositions of the invention may be prepared using either highly refined or technical DDT, the invention is directed more specifically to the use of technical DDT and still more particularly to the use of technical DDT having a set point between 87° C. and about 95° C. Technical DDT of a quality indicated by this set point range is further characterized by being soft and waxlike to the touch.

The adsorbent powders which may be employed in preparing the dispersed systems and compositions of the invention are those of pulverulent solids which have the characteristic of causing a soft, waxlike material to adhere to their surfaces. Typical of such adsorbent powders are fuller's earth, tricalcium phosphate, magnesium carbonate, dicalcium phosphate, diatomaceous earths, kieselguhr, chalk, charcoal, walnut shell flour, other nut shell flours, and wood flour. These adsorbent powders are employed in the preparation of the dispersed systems of this invention to provide dispersed systems containing as much as 55 per cent DDT by weight. When compositions containing larger concentrations of DDT are desired, then adsorbent powders having a lower bulk density are utilized.

In preparing dispersed systems containing about 55 to 80 per cent DDT by weight, it is necessary to employ an adsorbent powder which is an inorganic siliceous material having a bulk density less than 0.15 gram per cc. Such low bulk density material may generally be used in conjunction with the aforementioned adsorbent powders but may, of course, be used as the sole adsorbent powder if so desired.

Suitable inorganic siliceous adsorbent powders having a bulk density below 0.15 gram per cc. are Santocel 45 and Santocel 58, silica aerogels sold by the Monsanto Chemical Company; "Super-Absorbit," an expanded vermiculite; silicic acid of the special bulky grade supplied by the Mallinckrodt Company; hammer-milled finely pulverized asbestos; Celite 209, a diatomaceous earth sold by the Johns-Manville Company; and the calcium silicates sold under the name of "Silene."

The term "bulk density" as used in connection with the aforementioned inorganic siliceous adsorbent materials is the weight in grams of one cubic centimeter of loose, dry material measured without packing. This physical characteristic of fine powders is also referred to in the literature as "apparent density." The technique of making bulk density or apparent density determinations is set out, for example, in Gardner "Physical and Chemical Examinations of Paints, Varnishes, Lacquers, and Colors," 9th edition, 1939, page 279.

One skilled in the art will with the provision of the above list of adsorbent materials and with an understanding of the requirements and functions of the powders employed in preparing the dispersed systems of this invention readily know the type of materials which will serve as adsorbent powders. If there is any question as to the suitability of a selected powder to function as an adsorbent, such suitability may be readily determined by the following simple test to which all the above-mentioned adsorbent powders respond:

Take 100 grams of the powdered material to be evaluated. This material should have an average particle size of not more than about 50 microns. While agitating the powder vigorously, add to it 100 grams of molten DDT maintained at a temperature above its set point but below about 115° C. to obtain a homogeneous dispersion of the molten material in the powder. In other words, the rate of addition of the molten DDT and the agitation should be coordinated and the agitation continued until the molten DDT is uniformly dispersed thruout the powder. The agitation is then stopped and the mix is allowed to cool so that the molten DDT solidifies. If the mix after cooling to about room temperature can be readily poured from the container as a free-flowing dust having finely divided discrete particles, then the diluent under evaluation is said to be an adsorbent powder according to the usage employed herein. If, on the other hand, the cooled mix is not free flowing, contains gummy agglomerates, or is a non-pulverulent solid mass, then the diluent is said to be non-adsorbent.

Powders which are of the non-adsorbent type and which are therefore not suitable in preparing the dispersed systems of the invention are of the class illustrated by the following typical examples: talc, pyrophyllite, bentonite, kaolin, gypsum, pumice stone, and mica.

The non-adsorbent materials may, of course, be used as diluents for the DDT-adsorbent powder dispersed systems and as such may be added to the technical DDT-adsorbent powder mixture either before pulverizing or may, alternatively, be mixed with the dispersed system after it has been reduced to a particle size less than about 5 microns.

The technical DDT and adsorbent powder as above described are intimately mixed and subjected to attrition in order to provide the dispersed systems of the invention. The attrition required to produce the dispersed system having an average particle size less than about 5 microns may be suitably attained by use of the fluid energy type grinding means known as air attrition mills or jet pulverizers. In such pulverizing devices the mixture of technical DDT and adsorbent powder is suspended and buffeted in a high velocity gas stream whereby there occurs the required attrition or abrasion of the particles on each other and on the walls of the pulverizing equipment.

Air attrition mills which are particularly suited for preparing the dispersed systems of the compositions of this invention are those of the type described in detail in U. S. Patents 2,032,827, 2,219,011, and 2,284,746.

In order that the dispersed system prepared in the pulverizing step be uniform with respect to DDT content, the mixture of technical DDT and adsorbent powder fed to the pulverizer unit should be uniform. This uniformity of the feed mixture may be obtained by thoroly mixing the technical DDT and the adsorbent powder and this mixing may be attained in various ways such as thru the use of the common mixing or blending devices, such as ribbon blenders, ball mills, and various types of grinding equipment.

A preferred process for preparing the mixture to be used as feed to the pulverizer comprises adding molten DDT to the adsorbent powder having an average particle size less than about 50 microns while agitating the powder, followed, if desired, by grinding in a suitable mill, such as a Mikro-Pulverizer, whereby there is obtained a homogeneous mixture consisting of DDT dispersed on the adsorbent powder. This process for obtaining a mixture of DDT dispersed on an adsorbent powder, which mixture may be used as the starting material in processes for obtaining a dispersed system having an average particle size less than about 5 microns, is set out fully and in detail in my co-pending application Serial No. 585,801 filed March 30, 1945.

Alternatively, a suitable mixture for feed to the pulverizer may be obtained by mixing particulate technical DDT and an adsorbent powder having an average particle size less than about 50 microns in a mixing device such as a ribbon blender, grinding the mixture in a hammer mill, and then mixing the ground material again to insure uniformity.

As has been set out above, the compositions of this invention are characterized by containing a mixture consisting essentially of technical DDT and an adsorbent powder in a dispersed system, the particles of the dispersed system having an average size less than about 5 microns. By the term "dispersed system" it is meant that the mixture of the DDT and the adsorbent powder is such that the mixture is apparently a single substance rather than a mixture of discrete particles of DDT and adsorbent powder. In those compositions of the invention where DDT is present in large excess over the adsorbent powder, some of the DDT may be present as discrete particles. For the most part, however, the DDT adheres to the surface and is imbedded in the pores of the adsorbent powder so that the mixture appears to consist principally of extremely small particles of a single substance.

While the dispersed system of this invention consists essentially of technical DDT and an adsorbent powder, it is understood that such materials as wetting agents and dispersing agents may be pulverized with the DDT-adsorbent powder mixture and that when this is done the added agents also become in a large measure dispersed in and on the dispersed system and do, for all practical purposes, become a part of the dispersed system.

The improved effectiveness of the compositions of this invention is believed to result from the physical characteristics of the dispersed system and the particle size of this system. The particle size of the dispersed system is a critical factor if the full benefits of the compositions of the invention are to be realized. Thus the compositions of this invention contain a dispersed system having an average particle size less than about 5 microns.

By the use of the expression "average particle size less than about 5 microns" or "particles having an average size less than about 5 microns" it is meant that the average effective diameter of the particles of the dispersed system is less than about 5 microns.

The average effective diameter of a powdered material is numerically equal to six times the total volume of the material divided by the total surface of all the particles. The average effective diameter of the particles of the dispersed system of this invention, or, in other words, the average particle size of the dispersed system may be determined by use of an air permeability method of determining the particle size of powdered materials. The Fisher Sub-Sieve Sizer is a particularly suitable apparatus employing the air permeability method for use in determining the average effective diameter or average particle size of extremely finely ground material. Of course, other methods of determining average particle size will be apparent to one skilled in the art. For example, determination of average particle size by microscopic examination and measurement may be employed.

Having thus set out the basic concepts and essentials of the invention, such as the method to be employed in preparing the dispersed systems which are essential to the compositions of the invention, and having defined precisely what is intended by use of the expressions "technical DDT," "adsorbent powder," "dispersed system," and "average particle size less than about 5 microns," there follows a description of a preferred embodiment of the invention.

Preferred compositions of the invention comprise a dispersed system consisting of about 50 to 55 per cent by weight technical DDT and essentially all the remainder of the system an adsorbent powder, the particles of the dispersed system having an average size less than about 5 microns. These compositions are prepared by subjecting an intimate mixture of technical DDT and adsorbent powder, in the proportions of about 50 to 55 parts by weight of the DDT and at least 40 parts by weight of an adsorbent powder, to attrition preferably in an air attrition mill to obtain a mixture which is a dispersed system consisting essentially of technical DDT and adsorbent powder, the particle size of the dispersed system being less than about 5 microns.

In this preferred embodiment of the invention, one may also add small amounts of a wetting agent, a dispersing agent, or similar conditioning agent to the mixture of technical DDT and adsorbent powder before pulverizing and thus obtain as the product from the attrition step a technical DDT-adsorbent powder-wetting agent-dispersing agent-dispersed system having an average particle size less than about 5 microns. Alternatively, such wetting, dispersing, and conditioning agents may be omitted from the attrition step and merely mixed and blended with the technical DDT-adsorbent powder dispersed system after the latter has been prepared.

The dispersed system of this embodiment, consisting of about 50 to 55 per cent by weight technical DDT and essentialy all the remainder of the system an adsorbent powder and containing additionally, if so desired, a wetting agent and a dispersing agent, may be then diluted or modified by simple mixing or blending with further amounts of adsorbent powder, non-adsorbent powder, other insecticides, fungicides, bactericides, or combinations of these various materials to obtain dusts or water-dispersible compositions suited for a variety of methods of application and use.

In these preferred compositions of the invention as with all compositions of the invention comprising a dispersed system consisting essentially of technical DDT and the adsorbent powder, the particles of the dispersed system having an average size less than about 5 microns, it is not required that the entire composition have an average particle size less than about 5 microns. The improved utility of the compositions of the invention stem from the dispersed system, the particles of which have an average size less than about 5 microns. Thus compositions of this invention may comprise mixtures of the dispersed system having an average particle size less than about 5 microns with various other materials and the latter materials may, of course, have larger particle sizes.

Other preferred compositions of the invention comprise a dispersed system consisting essentially of about 55 to about 80 per cent by weight technical DDT and an adsorbent powder, said adsorbent powder containing an inorganic siliceous material having a bulk density less than about 0.15 gram per cc. in amount corresponding to at least 0.25 per cent by weight of the dispersed system for each 1 per cent by weight technical DDT in the system over 55 per cent by weight, the dispersed system characterized by having an average particle size less than about 5 microns.

In preparing the dispersed system containing from about 55 to about 80 per cent by weight of technical DDT, one may use as the adsorbent powder solely an inorganic siliceous material having a bulk density less than about 0.15 gram per cc. This is generally not necessary and it is preferable for economic reasons to employ as the adsorbent powder a mixture of a higher bulk density adsorbent material such as fuller's earth and others which have been set out heretofore, and an inorganic siliceous material. The amount of the inorganic siliceous material required to prepare the dispersed system satisfactorily increases as the amount of DDT included in the dispersed system is increased. The minimum amount of inorganic siliceous material required in such preparation is about 0.25 per cent by weight for each 1 per cent by weight of technical DDT in the system over 55 per cent by weight.

In preparing the dispersed system containing about 55 to about 80 per cent by weight of technical DDT, the components—technical DDT and the adsorbent powder containing the inorganic siliceous material—are first intimately mixed and the mixture subjected to impact and attrition preferably in an air attrition mill to obtain a dispersed system consisting of the three components, the particles of the system having an average size less than about 5 microns.

Alternatively, there may be added to the mixture before attrition a wetting agent and a dispersing agent and other similar conditioning agents if so desired so that the dispersed system obtained after attrition also contains the wetting and dispersing agents and may be readily dispersed in water. When wetting or dispersing agents are so employed, it is generally not necessary or desirable that the total amount so employed be in excess of about 5 per cent by weight of the dispersed system. It is preferable also when employing technical DDT of low set point in the preparation of water-dispersible compositions containing 75 to 80 per cent DDT to reduce the weight of DDT employed as the amount of wetting and dispersing agent used is increased. Thus, for example, if a total of 1 per cent of wetting and dispersing agent is employed in preparing a dispersed system, the maximum amount of low set point DDT used would be about 79 per cent, or if a total of 5 per cent of wetting and dispersing agent were used then the DDT would be reduced to about, say, 75 per cent.

The dispersed systems of the invention containing about 55 to about 80 per cent by weight of technical DDT either with or without wetting and dispersing agents are free flowing even after extended storage periods and are particularly useful since in addition to being more effective in the control of insects per unit of DDT applied than the powdered compositions heretofore available, they require less shipping and storage space and economies are also effected in shipping and handling costs. These powdered, dispersed systems can, of course, be readily mixed with the various diluent powders used in the art or with other pest control agents by a simple mixing or blending operation. The dispersed systems containing wetting and dispersing agents may be readily dispersed in water to form a relatively stable suspension of the solid particles in the water and the suspension so obtained may be applied by the usual agricultural spray equipment.

Among the dispersing agents suitable for inclusion in the water-dispersible compositions of this invention are goulac, the naphthalene formaldehyde condensation products such as Daxad No. 11 and the polymeric hydroxylated materials such as polyvinyl alcohol, methylcellulose, Daktose, and saponin.

Suitable wetting agents for inclusion in the water-dispersible compositions of the invention are the sodium alkonaphthalene sulfonates such as Alkanol B, the sodium alkylsulfates such as IN-181, sulfated hydrocarbons such as Aresklene 400, Alkanol B, Nacconol NR and Igepon T, and sodium lignin sulfonate. Numerous other suitable wetting and dispersing agents are listed in detail in Bulletin E-607 of the Bureau of Entomology and Plant Quarantine of the U. S. Department of Agriculture.

The compositions of the invention may include other insect toxicants such as metallic arsenates, fluosilicates, hexachlorocyclohexanes, phenothiazine, organic thiocyanates such as n-dodecyl thiocyanate, fenchyl thiocyanoacetate and beta-(thiocyanoethyl) beta(butoxyethyl)ether, nicotine, anabasine (neo-nicotine), nor-nicotine, rotenone and its congeners, sabadilla, ryania, hellebore, pyrethrum, N-isobutylundecylenamide, and aminomethyl sulfides.

The compositions may also contain bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long-chain quaternary ammonium halides and metallic derivatives of dithiocarbamic acid such as ferric dimethyldithiocarbamate.

The invention is illustrated by the following examples:

*Example 1*

Fifty (50) parts by weight of technical DDT and 50 parts by weight of fuller's earth having an average particle size less than about 50 microns are blended by introducing molten technical DDT into fuller's earth while agitating the latter in a ribbon mixer. This material is ground in a Mikro-Pulverizer and again mixed in a ribbon blender. This method of preparing an intimate mixture of technical DDT with an adsorbent powder is fully and more completely described in my co-pending application Serial No. 585,801.

The technical DDT-fuller's earth mixture is then subjected to impact and attrition in an air attrition mill of the type shown in Figure 6 of Kidwell Patent 2,219,011 to obtain a free-flowing dust composition consisting of a technical DDT-fuller's earth dispersed system having an average particle size of 2.5 microns.

The composition according to the above example may be then blended with other inert powdered diluents, insecticides, fungicides, bactericides, and other conditioning agents to provide compositions particularly suited to application in agricultural uses for the control of pests.

*Example 2*

Fifty (50) parts by weight of pulverulent technical DDT is mixed in a ribbon blender with 46.5 parts by weight of fuller's earth having an average particle size less than about 50 microns, 3 parts by weight of goulac, and 0.5 part by weight of Alkanol B, a sodium alkylnaphthalene sulfonate. This mixture after being blended to give a homogeneous material is passed thru an air attrition mill of the type shown in Figure 3 of Andrews Patent 2,032,827 to obtain a free-flowing, water-dispersible powder containing a technical DDT-fuller's earth-goulac-Alkanol B-dispersed system, the particles of which have an average size of 1.7 microns.

The composition of this example may be applied as a dust but preferably it is dispersed in water to a desired concentration and applied by means of the usual insecticide spray equipment.

*Example 3*

To 50 parts by weight of diatomaceous earth having an average particle size of 10 microns there is added with agitation 50 parts by weight of fused technical DDT. The agitation is continued until the mix is apparently a homogeneous powder. This powder is pulverized to obtain a technical DDT-diatomaceous earth dispersed system, the particles of which have an average size of 3.6 microns. The pulverized powder is then blended with additional pest control agents and conditioning agents to give the following composition:

10% pulverized product (equal parts of technical DDT and diatomaceous earth—average particle size 3.6 microns)
15% cube root (containing 5% rotenone)
5% technical ferric dimethyldithiocarbamate
35% china clay
33% talc
1% goulac
1% IN–181P (50% solution of sodium "Lorol" sulfate)

This composition is readily dispersible in water and is highly effective for the control of a wide variety of insects and fungi.

*Example 4*

A mixture is made in a ribbon blender to obtain a composition having the following formulation:

75% technical DDT
17% fuller's earth
5% "Santocel 58"
2% "Daxad No. 11"
1% Alkanol B This mixture after being suitably blended to give a uniform composition is then subjected to attrition in an air attrition mill to obtain a free-flowing, water-dispersible powder having an average particle size of 2.2 microns.

The composition of this example is preferably utilized by dispersing it in water and applying it to the area to be treated by means of a spray of the aqueous suspension.

*Example 5*

Pulverulent technical DDT is mixed with an adsorbent powder and inorganic siliceous material having a bulk density below 0.15 gram per cc., a wetting agent, and a dispersing agent to yield a mixture having the following composition:

70% technical DDT
20% tricalcium phosphate
7% Super-Absorbit
1% IN–181P
2% saponin This mixture is pulverized in an air attrition mill of the type shown in Figure 3 of Andrews Patent 2,032,827, and there is obtained a mixture of the components in a dispersed system, the particles of the mixture having an average size of 3.2 microns.

The composition of this example is highly effective for the control of a wide variety of insects and is preferably applied in the form of a dispersion in water.

*Example 6*

The following is illustrative of a dust composition containing 80 per cent technical DDT. The ingredients of the composition, pulverulent technical DDT having a setting point of 90.3° C., finely divided fuller's earth having an average particle size of 25 microns, and Santocel 58, are mixed in a ribbon blender to give the following composition:

80% technical DDT
14% fuller's earth
6% Santocel 58

The above mixture is passed thru an air attrition mill of the type shown in Figure 6 of Kidwell Patent 2,219,011 while regulating the air flow and feed rates so that there is obtained a technical DDT-fuller's earth-Santocel 58 dispersed system having an average particle size of 2.1 microns.

The composition of this example is suitable for application as a dust as is, although more preferably it is mixed with finely divided solid carriers prior to use or may, alternatively, be mixed with wetting or dispersing agents to provide a composition suitable for dispersion in water prior to application.

I claim:

1. In a process for the manufacture of a solid particulate dispersed system containing essentially technical DDT and an adsorbent powder, the step comprising pulverizing an intimate particulate solid mixture of technical DDT and an adsorbent powder by attrition and impact to an average particle size less than 5 microns by suspending and buffeting the mixture in a high velocity gas stream.

2. In a process for the manufacture of a solid particulate dispersed system containing essentially technical DDT and an adsorbent powder, the steps comprising forming an intimate particulate solid mixture of technical DDT and an adsorbent powder and pulverizing the intimate mixture by attrition and impact to an average particle size less than 5 microns by suspending and buffeting the mixture in a high velocity gas stream.

3. In a process for the manufacture of a solid particulate dispersed system containing essentially technical DDT and an adsorbent powder, the steps comprising forming, in the absence of a solvent for the DDT, an intimate particulate solid mixture consisting essentially of about 50 to 55% by weight technical DDT and an adsorbent powder, and pulverizing said intimate mixture by attrition and impact to an average particle size less than 5 microns by suspending and buffeting the mixture in a high velocity gas stream.

4. In a process for the manufacture of a solid particulate dispersed system containing essentially technical DDT and an adsorbent powder, the steps comprising forming, in the absence of a solvent for the DDT, an intimate particulate solid mixture consisting of about 50 to 55% by weight technical DDT, at least one conditioning agent from the group consisting of wetting agents and dispersing agents, the total amount of such conditioning agent in the mixture not exceeding about 5% by weight, and the remainder fuller's earth; and pulverizing said intimate mixture by attrition and impact to an average particle size less than 5 microns by suspending and buffeting the mixture in a high velocity gas stream.

5. In a process for the manufacture of a solid particulate dispersed system containing essentially technical DDT and an adsorbent powder, the steps comprising forming, in the absence of a solvent for the DDT, an intimate particulate solid mixture consisting of about 55 to about 80% by weight technical DDT, at least one conditioning agent from the group consisting of wetting agents and dispersing agents, the total amount of such conditioning agent in the mixture not exceeding about 5% by weight, and substantially all the remainder of the mixture being an adsorbent powder, said adsorbent powder containing an inorganic siliceous material having a bulk density less than about 0.15 gram per cc. in amount corresponding to at least 0.25% by weight of the mixture for each 1% by weight of technical DDT in the mixture over 55% by weight; and pulverizing said intimate mixture by attrition and impact to an average particle size less than 5 microns by suspending and buffeting the mixture in a high velocity gas stream.

6. In a process for the manufacture of a solid particulate dispersed system containing essentially technical DDT and an adsorbent powder, the steps comprising forming, in the absence of a solvent for the DDT, an intimate particulate solid mixture consisting of about 70 to 80% by weight technical DDT, at least one conditioning agent from the group consisting of wetting agents and dispersing agents, the total amount of such conditioning agent in the mixture not exceeding about 5% by weight, and the remainder an adsorbent powder, said adsorbent powder consisting of tricalcium phosphate and at least 25% by weight of a silica aerogel having a bulk density less than about 0.15 gram per cc.; and pulverizing said intimate mixture by attrition and impact to an average particle size less than 5 microns by suspending and buffeting the mixture in a high velocity gas stream.

7. An insecticidal composition comprising a dispersed system consisting essentially of technical DDT and an adsorbent powder, said dispersed system being prepared according to the process of claim 1.

8. An insecticidal composition comprising a dispersed system consisting essentially of technical DDT and an adsorbent powder, said dispersed system being prepared according to the process of claim 3.

9. An insecticidal composition comprising a dispersed system consisting essentially of technical DDT and an adsorbent powder, said dispersed system being prepared according to the process of claim 5.

ALBERT L. FLENNER.

REFERENCES CITED

The following references are of record in the file of this patent:

UNITED STATES PATENTS

| Number | Name | Date |
|---|---|---|
| 2,060,210 | Heckert | Nov. 10, 1936 |
| 2,161,462 | Flenner | June 6, 1939 |
| 2,207,737 | Hooft | July 16, 1940 |
| 2,218,031 | Reichert | Oct. 15, 1940 |
| 2,257,545 | Curtis | Sept. 30, 1941 |
| 2,420,928 | Bousquet | May 20, 1947 |
| 2,449,028 | Walker | Sept. 7, 1948 |

FOREIGN PATENTS

| Number | Country | Date |
|---|---|---|
| 348,184 | Great Britain | May 8, 1931 |
| 547,874 | Great Britain | Sept. 15, 1942 |
| 446,935 | Belgium | Sept. 30, 1942 |